(12) United States Patent
Wroblewski

(10) Patent No.: US 11,588,628 B1
(45) Date of Patent: Feb. 21, 2023

(54) SPACE-AND-WAVE-DIVISION DE-MULTIPLEXING OF A QUANTUM KEY DISTRIBUTION AND CLASSICAL CHANNELS INTO A SINGLE RECEIVING OPTICAL FIBER

(71) Applicant: United States of America as represented by the Administrator of NASA, Washington, DC (US)

(72) Inventor: Adam C. Wroblewski, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 141 days.

(21) Appl. No.: 17/218,788

(22) Filed: Mar. 31, 2021

Related U.S. Application Data

(60) Provisional application No. 63/002,460, filed on Mar. 31, 2020.

(51) Int. Cl.
*H04L 9/08* (2006.01)

(52) U.S. Cl.
CPC ............ *H04L 9/0858* (2013.01); *H04L 9/083* (2013.01); *H04L 9/085* (2013.01)

(58) Field of Classification Search
CPC ........ H04L 9/0858; H04L 9/083; H04L 9/085
See application file for complete search history.

(56) References Cited

U.S. PATENT DOCUMENTS

| 10,055,582 B1* | 8/2018 | Weaver | G06F 21/562 |
| 2005/0152540 A1* | 7/2005 | Barbosa | H04L 9/0858 380/28 |
| 2006/0045527 A1* | 3/2006 | Maeda | H04B 10/70 398/79 |
| 2010/0208893 A1* | 8/2010 | Toyoshima | H04L 9/0858 380/256 |

(Continued)

OTHER PUBLICATIONS

Mahmud et al.; "Securing and auto-synchronizing communication over free-space optics using quantum key distribution and chaotic systems", 2018, Proc. of SPIE, vol. 10771, pp. 1-14. (Year: 2018).*

(Continued)

*Primary Examiner* — Matthew Smithers
(74) *Attorney, Agent, or Firm* — Robert H. Earp, III; Mark Wolfgang

(57) ABSTRACT

A space and wave division multiplexing and demultiplexing system and method for quantum key distribution (QKD) using free space laser communications. The system operates to transmit a quantum channel, including a key of QKD, included in a combined laser transmission with a classical channel, including an encrypted message of QKD. The laser transmission can be transmitted through free space to a lens, wherein it is diffracted into two separate diffraction patterns and captured by a double clad optical receiver fiber having an inner core and a concentric outer core. The diffraction pattern of the classical channel is captured by the outer core, while the diffraction pattern of the quantum channel is captured by the inner core, thus allowing separate treatment of each channel.

20 Claims, 3 Drawing Sheets

(56) References Cited

U.S. PATENT DOCUMENTS

| | | | | |
|---|---|---|---|---|
| 2012/0063596 A1* | 3/2012 | Brodsky | ............... | H04L 9/0858 |
| | | | | 380/256 |
| 2013/0101119 A1* | 4/2013 | Nordholt | ............... | H04L 9/0852 |
| | | | | 380/278 |
| 2016/0218867 A1* | 7/2016 | Nordholt | ............... | H04L 9/0852 |
| 2016/0337032 A1* | 11/2016 | Johnson | ................ | H04L 63/061 |
| 2017/0343750 A1* | 11/2017 | Ashrafi | ................... | H04J 14/04 |
| 2017/0346627 A1* | 11/2017 | Alleaume | ............. | H04L 9/0852 |
| 2019/0013865 A1* | 1/2019 | Boruah | ................ | H04B 10/548 |
| 2021/0266142 A1* | 8/2021 | Kuang | ................. | H04B 10/556 |

OTHER PUBLICATIONS

Endo et al.; "Numerical Study on Secrecy Capacity and Code Length Dependence of the Performances in Optical Wiretap Channels", 2015, IEEE Photonic Journal, vol. 7, No. 5, pp. 1-19. (Year: 2015).*

Djordjevic et al.; "Quantum channel capacity for OAM based free-space optical communications", 2012, Proc. of SPIE, vol. 8518, pp. 1-7. (Year: 2012).*

Rogers et al.; "Free-space quantum cryptography in the H-alpha Fraunhofer window", 2006, Proc. of SPIE, vol. 6304, pp. 1-11. (Year: 2006).*

* cited by examiner

SPACE-AND-WAVE-DIVISION DE-MULTIPLEXING OF A QUANTUM KEY DISTRIBUTION AND CLASSICAL CHANNELS INTO A SINGLE RECEIVING OPTICAL FIBER

CROSS REFERENCE TO RELATED APPLICATION

This application claims priority to U.S. Provisional Patent Application Ser. No. 63/002,460 filed Mar. 31, 2020, which is expressly incorporated herein by reference.

ORIGIN OF THE INVENTION

The invention described herein was made by employees of the United States Government and may be manufactured and used by or for the Government for Government purposes without the payment of any royalties thereon or therefor.

BACKGROUND

Quantum key distribution (QKD) is a secure communication method that enables two communicating parties to produce a shared secret key known only to them, which key is then used to encrypt and decrypt classical messages sent between the parties. The key in QKD is made up of polarization encoded photons transmitted by a quantum communication channel (i.e. a communication channel capable of transmitting quantum information) at very low power (i.e. near single photon levels in quantum states). When fiber optics are used for the quantum channel, relatively small optical fibers are required to inhibit the loss of the polarization states of the QKD photons of the key as they are transmitted through the fibers, and these small fibers typically consist of only single mode (SM) or polarization maintaining (PM) fibers having a diameter of about 6-12 μm.

On the other hand, the encrypted classical messages are transmitted by classical communication channels (i.e. communication channels not transmitting quantum information), which are typically much higher in power than those used to transmit the key. For this purpose, free space laser communications systems can be used, where a laser is used for transmitted communications through free space to a receiver of fiber optics. The laser is aimed at a receiver optical fiber, which fiber has a relatively large size (e.g. 100-110 pm diameter) and thus provides a relatively large target for the laser transmission of the classical communication channel. However, with respect to a key in QKD, this large fiber is not suitable as the quantum channel to transmit the polarization encoded QKD photons. This is because the large diameter of the fiber allows for a loss of the polarization states of the QKD photons as they are transmitted through such a large fiber.

While smaller sized SM and PM fibers maintain the polarization states of the QKD photons and thus are suitable for carrying the quantum channel, they are not suitable as receiver fibers for free space laser transmissions because their relatively small size of about 6-12 μm diameter makes them a difficult target for receiving the laser transmissions. Thus, there is a difficulty in using optical fibers to receive a quantum channel free space laser communication.

SUMMARY

In one aspect, a system for quantum key distribution includes a transmission terminal including a first laser and a second laser, and a receiver terminal including a lens and a receiver optical fiber. The first laser is configured to transmit an encrypted message in a classical communication channel to the lens. The second laser is configured to transmit a key in a quantum communication channel to the lens. The key is configured for decoding the encrypted message and including polarization encoded photons. The wavelength associated with the classical communication channel and the wavelength associated quantum communication channel are characterized by a wavelength separation such as 30-40 nanometers. The receiver optical fiber includes an inner core and an outer core concentric with the inner core and radially surrounding the inner core. The inner core has a diameter that maintains polarization states of the polarization encoded photons of the key. The lens is configured to produce a first diffraction pattern by diffracting the classical communication channel, and a second diffraction pattern by diffracting the quantum communication channel. The first diffraction pattern mostly irradiates the outer core, and the second diffraction pattern mostly irradiates the inner core.

In another aspect, a quantum key distribution method includes providing a system including a transmission terminal including a first laser and a second laser, and a receiver terminal including an achromatic lens and a receiver optical fiber including an inner core and an outer core concentric with, and radially surrounding, the inner core. The method includes pointing the first laser and the second laser at the lens. The method includes transmitting to the lens and from the first laser, an encrypted message in a classical communication channel, and transmitting from the second laser, a key in a quantum communication channel. The key is configured for decoding the encrypted message and including polarization encoded photons. The method includes capturing the classical communication channel in the outer core and capturing the quantum communication channel in the inner core. The inner core has a diameter that maintains polarization states of the polarization encoded photons of the key, and the classical communication channel and the quantum communication channel are wavelength separated by 30-40 nanometers.

DETAILED DESCRIPTION

Figure 1:
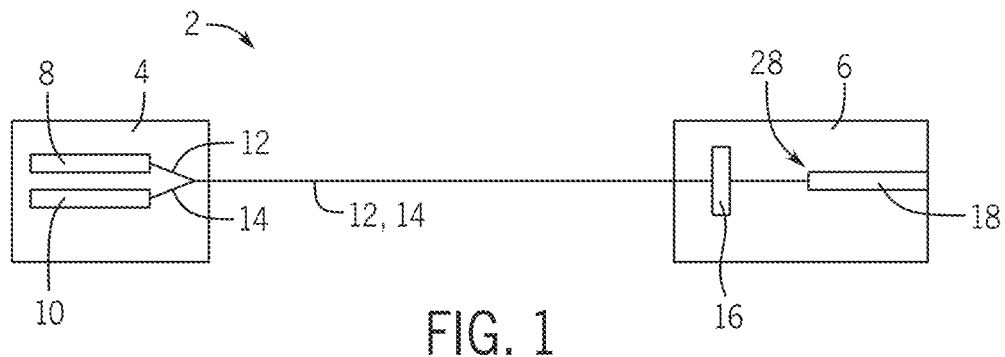
FIG. 1 is a schematic diagram of a free space optical communication system according to the present subject matter.

QKD includes a classical optical channel as well as the single photon regime quantum channel. In free-space laser communication, the classical data channel is used for data transmission as well as for establishing proper pointing of the laser and the receiver, acquisition of the laser transmission, and tracking of the laser. The pointing, acquisition and tracking functions of the receiver are controlled based on the use of closed loop feedback between a quadrant cell photoreceiver and a fast steering mirror. The classical channel is typically captured by a large optical fiber (e.g. 100-110 μm diameter). However, this large fiber is not suitable for use with the quantum channel because its large size allows for the loss of the polarization states of the QKD photons. Instead, the quantum channel may be captured and further transmitted within a smaller optical fiber, e.g. 6-12 μm diameter SM or PM fiber, in order to preserve polarization information of the QKD photons. However, to capture these two channels using separate receiver fibers (i.e. a large fiber for the classical channel and a small fiber for the quantum channel) would introduce another layer of complexity in the free-space laser communication involving QKD, and would produce difficulties in the alignment of an additional small receive fiber for the quantum channel.

With reference to the figures, the present invention addresses these difficulties, and provides a free-space optical laser communication system 2 for quantum key distribution, including a transmission terminal 4 and a receiver terminal 6. The transmission terminal 4 includes lasers 8, 10 that generate multiple optical laser transmissions 12, 14, which are combined (multiplexed) and simultaneously transmitted to the receiver terminal 6. The laser transmissions 12, 14 may be any suitable wavelengths, and these may differ by a wavelength separation such as 15-55 nm, 25-45 nm, 30-40 nm, or 35 nm±1 nm (e.g. 34.25 nm). A first laser transmission 12 generated by and transmitted from the first laser 8 is the higher power classical communication channel including the encrypted QKD message. The first laser transmission 12 (also referred to as "classical channel" or "classical communication channel") may have a wavelength in the C-band of 1530-1565 nm, or 1555.75 nm±5 nm. A second laser transmission 14 generated by and transmitted from the second laser 10 is the quantum channel including the QKD key. The second laser transmission 14 (also referred to as "quantum channel" or "quantum communication channel") may have a wavelength in the L-band of 1565-1625 nm, or 1590 nm±5 nm. In exemplary embodiments, the wavelength associated with the first laser transmission 12 is shorter than the wavelength associated with the second laser transmission 14. Alternatively, the wavelength associated with the first laser transmission 12 is longer than the wavelength associated with the second laser transmission 14. Accordingly, it should be appreciated that the specific wavelengths provided herein are exemplary embodiments. Other wavelengths and other wavelength separations are suitable for transmission of data via a classical channel and for QKD via a quantum channel.

The first laser transmission 12 includes the encrypted message of the QKD, and the second laser transmission 14 includes a key of the QKD, which includes polarization encoded photons. The key is used for decoding the encrypted message after transmission to the receiver terminal 6.

Both communication channels 12, 14 are combined together (i.e. multiplexed) and transmitted to the receiver terminal 6 (FIG. 1). That is, the first laser 8 and the second laser 10 may be pointed at the same target, i.e. a lens 16 of the receiver terminal 6. For this purpose, the transmission terminal 4 may include a gimbal (not shown), which utilizes closed loop feedback based on data associated with the classical channel 12 for fine pointing, acquisition, and tracking the first laser 8. Data associated with the closed loop feedback at transmission terminal 4 may be transmitted to the receiver terminal 6.

Pointing of the second laser 10 is coupled to the pointing of the first laser 8, so that both lasers 8, 10 are pointed at a lens 16 of the receiver terminal 6. In other words, the first and second lasers 8, 10 are jointly pointed based on pointing, acquisition, and tracking of the first laser 8, and not on pointing, acquisition, and tracking of the second laser 10. As such, the combined channels 12, 14 are accurately directed at the receiver terminal 6 as desired. In other words, the classical data channel 12 is used for establishing proper pointing of the first laser 8, acquisition of the laser transmission over the classical channel 12 and tracking of the first laser 8. These functions are controlled based on the use of closed loop feedback between the transmission terminal 4 and the receiver terminal 6. Such feedback is transmitted over the classical channel 12 and may be based on the use of a quadrant cell photoreceiver and a fast steering mirror. The second laser 10 is pointed as a function of pointing of the first laser 8. In this way, pointing of the second laser 10 is based on (coupled with) the pointing of the first laser 8, so that both channels 12, 14 are accurately transmitted to the receiver terminal 6. The first laser 8 is therefore configured to be pointed based on closed loop feedback data associated with the classical communication channel 12 and between the transmission terminal 4 and the receiver terminal 6, and the second laser 10 is configured to be pointed based on the same closed loop feedback.

Figure 2:
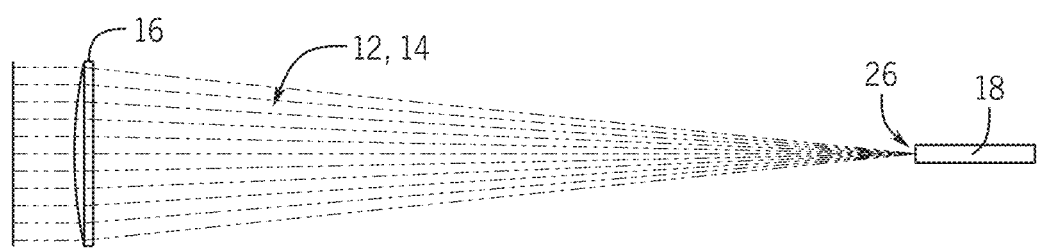
FIG. 2 a detailed portion of FIG. 1.
Figure 3:
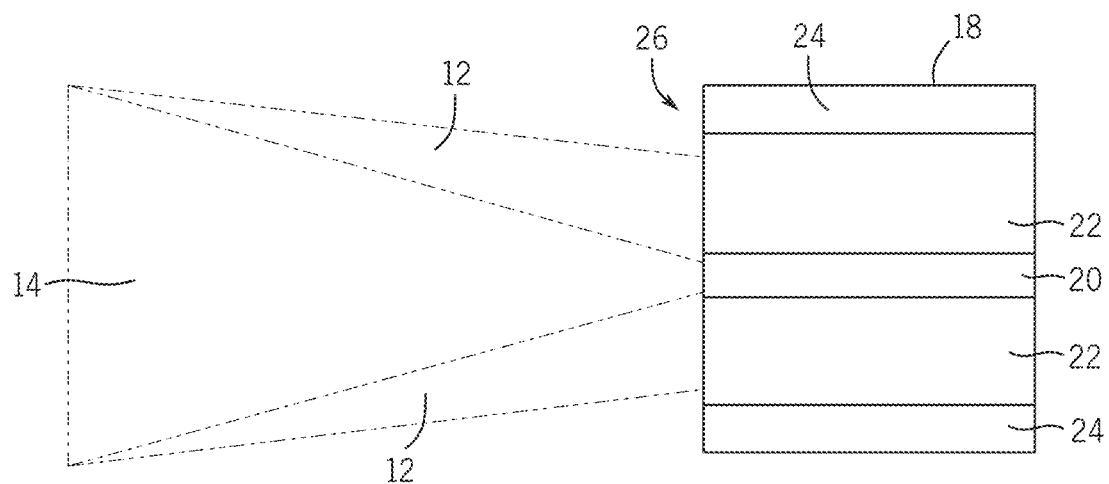
FIG. 3 a detailed portion of FIG. 2.

The receiver terminal 6 includes a single focus lens 16 and an integral receiver optical fiber 18. The combined channels 12, 14 are transmitted to the lens 16, which is configured to diffract the multiplexed channels 12, 14 so they are separated from one another by space and wave division demultiplexing (FIGS. 2-3). The receiver fiber 18 has two distinct but integral cores 20, 22 (FIG. 3) that are each configured to separately capture and further transmit a respective one of the two diffracted optical communication channels 12, 14. That is, the distinct cores 20, 22 allow for separate capture of both the quantum channel 14 and the classical channel 12. In particular, the receiver fiber 18 is a double clad receiver fiber that has a single mode inner core 20 and a multimode outer core 22 concentric with, and radially surrounding the inner core 20. The inner and outer cores may be formed in separate steps, contact each other, and comprise silicon glass. The receiver fiber 18 may also include other layers or coatings, such as a cladding 24 contacting and radially surrounding the outer core 22, a protective coating (not shown) radially surrounding the cladding 24, and a jacket (not shown) radially surrounding the coating.

The inner core 20 is capable of receiving the diffracted quantum channel 14, e.g. laser transmissions having a wavelength suitable for quantum communication such as 1565-1625 nm. An appropriately sized inner core 20 may have a relatively small diameter configured to maintain the polarization of the QKD photons in the quantum channel 14. To maintain the polarization of the QKD photons the diameter of the inner core 20 may be associated with transmission of a single mode of light from a single mode laser. Exemplary diameters include 3-15 μm, 6-12 μm, or 9 μm±1 μm. The outer core 22 is capable of receiving the diffracted classical channel 12, e.g. laser transmissions having a shorter wavelength than the communications channel such as 1530-1565 nm. The outer core 22 has a larger diameter than the inner core 20 for transmitting the classical channel 12. The diameter of the outer core 22 may be any suitable diameter associated with propagation of multiple modes of light from a multimode laser. Exemplary diameters include 95-115 μm, 100-110 μm, or 105 μm±1 μm; or 40-60 μm, 45-55 μm, or 50 μm±1 μm; or of 50-70 μm, 55-65 μm, or 62.5 μm±1 μm.

The inner core 20 and outer core 22 may have different refractive indices, and the outer core 22 and cladding 24 may have different refractive indices. The different refractive indices allow for the two channels 12, 14 to be further transmitted by internal reflection through the respective core 20, 22 and in a direction along a length of the receiver fiber 18 away from the receiving end 28 of the receiver fiber 18.

During QKD, the two channels 12, 14 are multiplexed and transmitted to and through the lens 16, which lens 16 operates to space and wave division demultiplex the two channels 12, 14 and focus them at a common focal point 26 on the opposite side of the lens 16. The lens 16 and the receiver fiber 18 can be separated from each other by a gap (e.g. 330-345 mm, or 338 mm±1 mm) based on the distance the focal point 26 is from the lens 16, so that the focal point 26 is at the receiving end 26 of the fiber 18.

Figure 4:
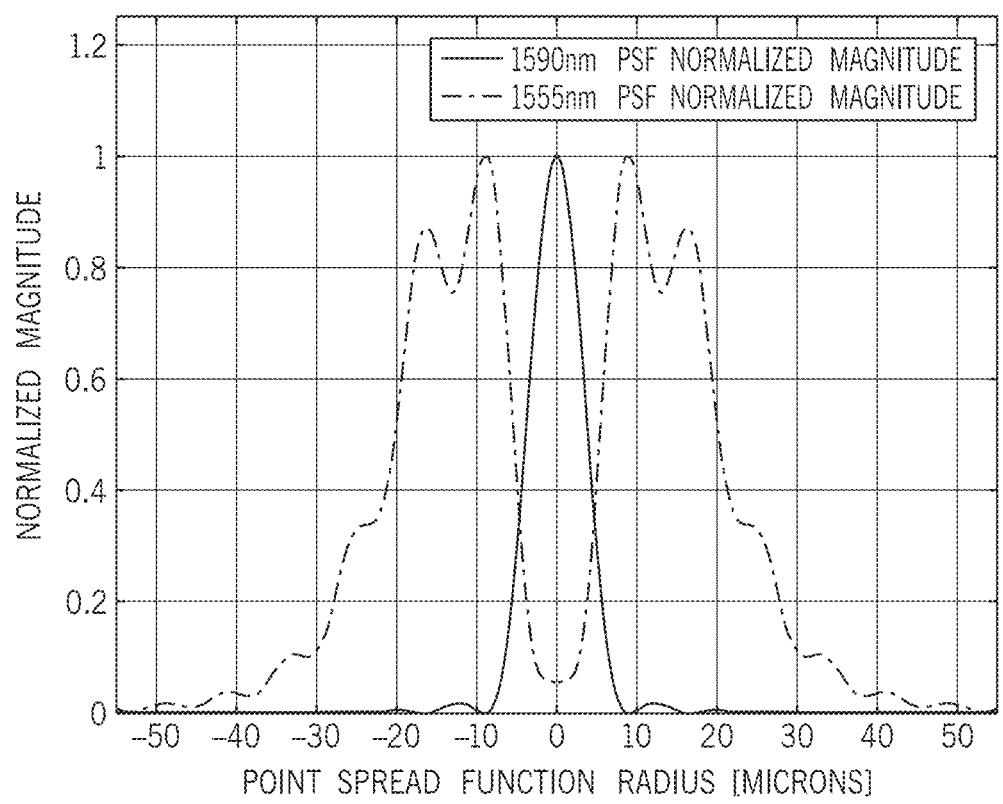
FIG. 4 is a point spread function graph of diffracted laser transmissions according to the present subject matter.

The lens 16 diffracts the two channels 12, 14 so that they are spatially separated from one another at the focal point 26, which spatial separation is due to their different wavelengths. By this space and wave division demultiplexing of the two channels 12, 14, two separate diffraction patterns (FIGS. 4-6) are produced at the focal point 26 at the receiving end 28 of the receiver fiber 18. After passing through the lens 16, the classical channel 12, including the encrypted message, forms a first diffraction pattern in a shape of a ring with a "hollow" center, with the ring being centered on and mostly contained in the outer core 22 and the "hollow" center being centered on the inner core 20. As such, the diffracted classical channel 12 mostly irradiates the outer core 22 around the inner core 20. After passing through the lens 16, the quantum channel 14, including the QKD key, forms a second diffraction pattern having a shape of a dot, with the dot being centered on and mostly contained in the inner core 20. As such, the diffracted quantum channel 14 mostly irradiates the inner core 20. The lens 16 may comprise N-BK7 glass and is non-chromatic corrected.

Figure 5:
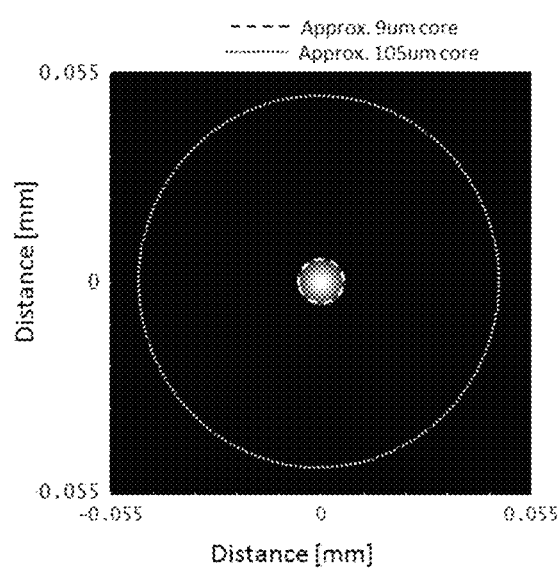
FIG. 5 is a computed irradiance diagrams of a diffracted quantum channel laser transmission according to the present subject matter.
Figure 6:
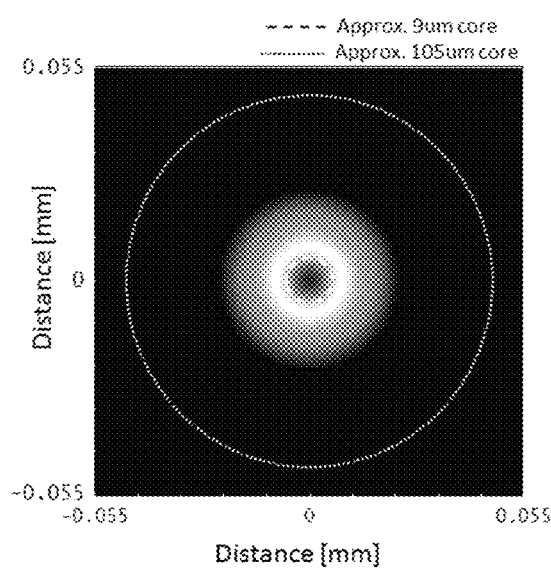
FIG. 6 is a computed irradiance diagrams of a diffracted classical channel laser transmission according to the present subject matter.

This is shown in FIGS. 3-6, where the quantum channel 14 is diffracted to mostly illuminate on the inner core 20, and the classical channel 12 is diffracted to mostly illuminate around the inner core 20 and onto the outer core 22. While a minor portion of both diffracted channels 12, 14 may partially irradiate the other respective core, this is minimized by the diffraction patterns provided by the lens 16, i.e. the ring and the dot (FIG. 5). This space and wave division multiplexing produced by the lens 16 on the two channels 12, 14, is a result of the difference between the wavelengths of the two channels, e.g. about 35 nm (e.g. 35 nm±1 nm, or 34.25 nm) wavelength separation between the two channels 12, 14. This diffraction produced by the lens 16 allows for the QKD photons of the quantum channel 14 to focus within the diffraction limit mostly onto the inner core 20, and the classical communication channel 12 to be focused and coupled mostly into the outer core 22.

The quantum channel 14, including the QKD key, is further transmitted through the inner core 20 for subsequent polarization processing of the key, while the classical channel 12, including the QKD encrypted message, is further transmitted through the outer core 22 for traditional data demodulation and decoding of the encrypted message using the key of the QKD.

The present subject matter thus allows QKD using free-space laser communications, which QKD includes both the classical optical channel 12 as well as the single photon regime quantum channel 14, which two channels are multiplexed into a single transmission. The laser communication gimbal uses the classical channel 12 for its fine pointing and tracking in order to point the two lasers 8, 10 and steer the combined incoming laser signals 12, 14 into the lens 16 and into the receiving fiber 18. Pointing the second laser 10 to steer the quantum channel 14 would normally be a difficult task in a dynamic environment because of the small size of the receiving SM or PM fiber necessary for capturing the quantum channel 14. A conventional solution would need to rely on larger-core multimode fibers (100-110 μm diameter) as the receiver fibers. However, because of their relatively large diameter, larger-core multimode fibers are not suitable for transmitting the quantum channel 14 because all polarization encoded information would not be retained.

The present subject matter addresses this issue by pointing the second laser 10 and the lens 16 of the receiver by using feedback provided by reception of the classical channel 12 transmitted by the first laser 8. This can be accomplished by utilizing the double clad receiver fiber 18, which can have a 6-12 μm diameter inner core 20 and a 100-110 μm diameter outer core 22. This arrangement allows for capturing both the QKD photons of the key (at 1565-1625 nm wavelength) in the 9 μm inner core 20, as well as capturing the classical data channel (at a wavelength of 1530-1565 nm) in the larger 100-110 μm diameter outer core 22, which can be used to provide the feedback necessary for pointing both lasers 8, 10 and for pointing, acquisition, and tracking by the receiver 6. Moreover, the lens 16 provides wavelength and space division demultiplexing of the incoming combined laser signals 12, 14, by diffracting the two channels and thus providing wavelength separation between the longer wavelength quantum channel 14 (e.g., 1565-1625 nm) and the shorter wavelength classical channel (1565-1625 nm). In another embodiment, the lens 16 may provide wavelength and space division demultiplexing of the incoming combined laser signals 12, 14, by diffracting the two channels and thus providing wavelength separation between a shorter wavelength quantum channel 14 and a longer wavelength classical channel. Diffracting the two channels allows for separate capture and treatment of the key of the quantum channel in the inner core 20, and the encrypted message of the classical channel in the outer core 22.

The lens 16 is configured to focus only the quantum channel 14 to a diffraction limited spot onto the 9 μm core of the double clad receiver fiber 18. The wavelength separation (i.e. the difference in their respective wavelengths, for example, 30-40 nm) between the quantum channel 14 and the classical channel 12, allows the classical channel 12 to be defocused by the lens to generate a ring-shaped diffraction pattern having a "hollow" center, where most of the optical power of the classical channel 12 is arranged in concentric rings outside of the 6-12 μm diameter inner core 20, yet inside of the 100-110 μm diameter outer core 22. This is shown in the point spread function shown in FIG. 4 for example, where a 1590 nm quantum channel 14 has a single peak centered at zero microns, and a 1555 nm classical channel 12 has a double peak on either side of the central peak of the quantum channel 14 and a valley (i.e. "hollow" center) between the peaks that is centered at zero microns. This graph of FIG. 4 thus indicates how the peak of the quantum channel 14 may be focused on the inner core 20 (e.g., a 9 μm diameter inner core), while at the same time the classical channel 12 may be focused around the inner core 20 and onto the outer core 22. This is also shown in computed irradiance at the face of the double-clad fiber based on physical optics wave propagation calculations of FIGS. 5-6 for example, where in FIG. 5 there is shown a 1590 nm quantum channel 14 being focused mostly into a single mode inner core of approximately 9 μm diameter, and in FIG. 6 there is shown a 1555 nm classical channel 12 being focused mostly into a multimode outer core of approximately 105 μm diameter.

Pointing of the quantum channel 14 is paired with, and thus coincides with the pointing of the classical channel 12 so that both impinge on the lens 16. As such, as long as the gimbal of the laser transmission terminal 4 provides accurate pointing, acquisition, and tracking (PAT) so that the classical channel 12 is transmitted to the lens 16 and then coupled into the 100-110 μm diameter outer core 22, then the quantum channel 14 can also be accurately transmitted to the lens 16 and into the 6-12 μm diameter inner core 20.

Through the use of the focusing lens 16, which is optimized for a single wavelength and thus is not an achromatic lens, a wavelength separation (e.g., around 30-40 nm) between the quantum channel 14 and the classical channel 12 can provide sufficient space and wave division demultiplexing. The wavelength separation causes diffraction by the lens 16 such that the quantum channel 14 (e.g., at 1565-1625 nm wavelength) can be focused to a diffraction limited spot on the inner core 20, and simultaneously the classical channel 12 (e.g. at 1530-1565 nm wavelength) can be defocused to a diffraction pattern in the shape of a ring including a "hollow" center and closely matched to the size and cross-sectional ring shape of the outer core 22. This configuration of the receiver fiber 18 allows for capturing both the key of quantum channel 14 in the inner core 20, as well as simultaneously capturing encrypted message of the classical channel 12 in the larger outer core 22.

Additional channels can be included in the combined laser transmission, e.g. for the purposes of timing and synchronization, such as a channel having a wavelength different from the classical channel 12 but still wavelength separated from the quantum channel by an appropriate wavelength separation such as 30-40 nm.

The present invention allows for novel space and wave division multiplexing for practical, fiber-based QKD, and provides a relatively simple and low-cost approach to capture multiple optical communication channels that have different transmission and capturing requirements. The QKD quantum channel 14 and the classical data channel 12 are multiplexed and jointly transmitted to the lens 16, which space and wave division multiplexes the two channels to separate them from each other. The QKD quantum channel 14 is captured by the SM or PM inner core 20 for polarization manipulation, and the classical data channel 12 is captured by the larger outer core 22 to increase signal-to-noise ratios for successful free-space optical communication.

A method of QKD includes providing the system 2 including the transmission terminal 4, which includes the first laser 8 and a second laser 10, and the receiver terminal 6 including the achromatic lens 16 and the receiver optical fiber 18, which includes the inner core 20 and an outer core 22 concentric with, and radially surrounding the inner core 20. The first laser 8 and the second laser 10 are pointed at the lens 16. The method includes transmitting to the lens 16 and from the first laser 8, an encrypted message in a classical communication channel 12, and transmitting from the second laser 10, a key in a quantum communication channel 14. The key is configured for decoding the encrypted message, and for this the quantum communication channel 14 includes polarization encoded photons. The classical communication channel 12 is captured in the outer core 22, and the quantum communication channel 14 is captured in the inner core 20. The inner core 20 has a diameter that maintains polarization states of the polarization encoded photons of the key. The classical communication channel 12 and the quantum communication channel 14 are configured with a wavelength separation such as 30-40 nm.

In the method, the first laser 8 and the second laser 10 are pointed to the lens 16 according to closed loop feedback transmitted over the classical communication channel 12 and between the transmission terminal 4 and the receiver terminal 6. In exemplary embodiments, a controller may adjust the receiver terminal 6 for pointing, acquisition, and tracking based on closed loop feedback from detection of the classical data channel using a quadrant photodetector and/or a fast steering mirror. The classical communication channel 12 and the quantum communication channel 14 may be simultaneously transmitted to and diffracted by the lens 16. The classical communication channel 12 and the quantum communication channel 14 may be transmitted through free space by the respective laser 8, 10 to the lens 16.

It will be appreciated that various of the above-disclosed and other features and functions, or alternatives or varieties thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. A system for quantum key distribution, the system comprising:
    a transmission terminal including a first laser and a second laser, and
    a receiver terminal including a lens and a receiver optical fiber,
wherein:
    the first laser is configured to transmit an encrypted message in a classical communication channel to the lens, the second laser is configured to transmit a key in a quantum communication channel to the lens, the key is configured for decoding the encrypted message and including polarization encoded photons, and the classical communication channel and the quantum communication channel are characterized by a wavelength separation;
    the receiver optical fiber includes an inner core and an outer core concentric with the inner core and radially surrounding the inner core, the inner core has a diameter that maintains polarization states of the polarization encoded photons of the key;
    the lens is configured to produce a first diffraction pattern by diffracting the classical communication channel, and a second diffraction pattern by diffracting the quantum communication channel; and
    the first diffraction pattern mostly irradiates the outer core, and the second diffraction pattern mostly irradiates the inner core.

2. The system according to claim 1, wherein:
    the first laser is configured to be pointed based on closed loop feedback with or without transmission over the classical communication channel and between the transmission terminal and the receiver terminal, and
    the second laser is configured to be pointed based on the closed loop feedback.

3. The system according to claim 1, wherein the classical communication channel has a wavelength shorter than the quantum communication channel.

4. The system according to claim 3, wherein the quantum communication channel has a wavelength of longer than the classical communication channel.

5. The system according to claim 1, wherein the inner core has a diameter associated with propagation of a single mode of light.

6. The system according to claim 1, wherein the outer core has a diameter associated with propagation of multiple light modes of light.

7. The system according to claim 1, wherein the first diffraction pattern is in a shape of a ring centered on the outer core.

8. The system according to claim 1, wherein the second diffraction pattern is in a shape of a dot centered on the inner core.

9. The system according to claim 1, wherein the system is a free-space optical laser communication system.

10. A quantum key distribution method comprising:
providing a system including a transmission terminal including a first laser and a second laser, and a receiver terminal including an achromatic lens and a receiver optical fiber including an inner core and an outer core concentric with, and radially surrounding, the inner core;
pointing the first laser and the second laser at the lens;
transmitting to the lens and from the first laser, an encrypted message in a classical communication channel, and transmitting from the second laser, a key in a quantum communication channel, the key being configured for decoding the encrypted message and including polarization encoded photons;
capturing the classical communication channel in the outer core, and capturing the quantum communication channel in the inner core;
wherein the inner core has a diameter that maintains polarization states of the polarization encoded photons of the key, and
wherein the classical communication channel and the quantum communication channel are characterized by a wavelength separation.

11. The method according to claim 10, wherein the first laser and the second laser are pointed according to closed loop feedback transmitted over the classical communication channel and between the transmission terminal and the receiver terminal.

12. The method according to claim 10, wherein the classical communication channel and the quantum communication channel are simultaneously transmitted to, focused and diffracted by the lens.

13. The method according to claim 10, wherein the first diffraction pattern is in a shape of a ring centered on the outer core.

14. The method according to claim 10, wherein the second diffraction pattern is in a shape of a dot centered on the inner core.

15. The method according to claim 10, wherein:
the system is a free-space optical laser communication system; and
the classical communication channel and the quantum communication channel are transmitted through free space.

16. A quantum key distribution (QKD) receiver comprising:
a lens; and
a double clad fiber coupled to the lens, wherein the double clad fiber includes an inner core and an outer core concentric with the inner core;
wherein, the lens is configured to diffract a first wavelength associated with a QKD channel to the inner core and to diffract a second wavelength associated with a classical data channel to the outer core.

17. The QKD receiver according to claim 16, wherein the first wavelength is longer than the second wavelength.

18. The QKD receiver according to claim 16, wherein the inner core has a diameter associated with a single mode at the first wavelength.

19. The QKD receiver according to claim 16, wherein the outer core has a diameter configured to propagate multiple light modes at the second wavelength.

20. The QKD receiver according to claim 16, wherein the lens is further configured to diffract at least one of a synchronization channel and a timing channel to the outer core.

* * * * *